United States Patent Office.

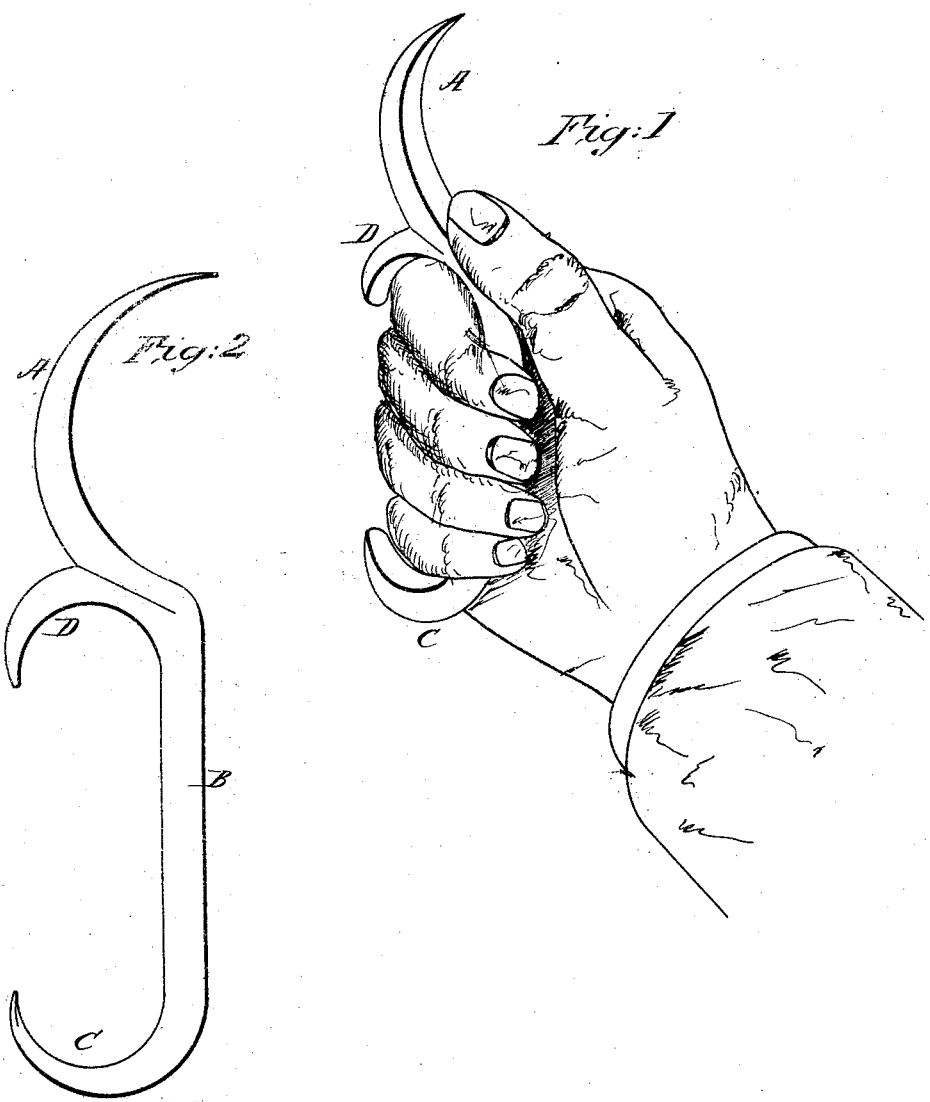

LYMAN H. JOHNSON, OF BRANFORD, CONNECTICUT, ASSIGNOR TO HIMSELF AND CHAUNCEY JOHNSON, OF SAME PLACE.

*Letters Patent No. 76,464, dated April 7, 1868.*

IMPROVEMENT IN CORN-HUSKER.

*The Schedule referred to in these Letters Patent and making part of the same.*

TO ALL WHOM IT MAY CONCERN:

Be it known that I, LYMAN H. JOHNSON, of Branford, in the county of New Haven, and State of Connecticut, have invented a new Improvement in Corn-Husker; and I do hereby declare the following, when taken in connection with the accompanying drawings, and the letters of reference marked thereon, to be a full, clear, and exact description of the same, and which said drawings constitute part of this specification, and represent, in—

Figure 1, the invention as in use, and in

Figure 2 a side view of the same.

The object of this invention is to afford a cheap and convenient instrument to aid in the removal of husks from corn, and consists in a pointed hook formed upon a handle, the said handle being constructed so as to form a bearing or seat for the hand, by which the hook may be forced forward or drawn backward.

To enable others to construct and use my improvement, I will proceed to describe the same as illustrated in the accompanying drawings.

A is the hook pointed and formed upon a handle, B, the said handle constructed with a hook or rest, C, and a corresponding hook or rest, D, at the base of the hook A, so that the hand may be inserted therein, as seen in fig. 1. The upper rest, D, serves as a bearing upon the hand, to enable the operator to more easily force the hook forward or into the husks; and the other rest, C, serves as a like bearing to pull or draw the hook.

The hook being held in one hand, as seen in fig. 1, the unhusked corn in the other hand, the point of the hook is inserted into the husks around the corn, (the rest D facilitating this operation,) and when so inserted, a pull upon the hook (the rest C facilitating the operation) tears the husks from the corn.

This instrument may be formed from malleable iron, and thus be produced at an expense of but a few cents, and is one of the most convenient instruments for this purpose yet produced.

Having thus fully described my invention, what I claim as new and useful, and desire to secure by Letters Patent, is—

The herein-described corn-husker, consisting of the hook A upon the handle B, provided with the rests C and D, substantially as herein described, as a new article of manufacture.

LYMAN H. JOHNSON.

Witnesses:
JOHN E. EARLE,
A. J. TIBBITS.